C. F. PYM.
LASTING MACHINE.
APPLICATION FILED MAY 3, 1909.

938,514.

Patented Nov. 2, 1909.
8 SHEETS—SHEET 1.

Fig. 1.

WITNESSES:
A. M. Shannon
Gordon C. Bennett

INVENTOR
Charles F. Pym
BY 
ATTORNEYS

C. F. PYM.
LASTING MACHINE.
APPLICATION FILED MAY 3, 1909.

938,514.

Patented Nov. 2, 1909.
8 SHEETS—SHEET 2.

Fig. 2.

WITNESSES:
A. M. Shannon.
Gordon C. Bennett.

INVENTOR
Charles F. Pym
BY
ATTORNEYS

C. F. PYM.
LASTING MACHINE.
APPLICATION FILED MAY 3, 1909.

938,514.

Patented Nov. 2, 1909.
8 SHEETS—SHEET 6.

WITNESSES:
A. M. Shannon.
Gordon C. Bennett.

INVENTOR
Charles F. Pym
BY

ATTORNEYS

C. F. PYM.
LASTING MACHINE.
APPLICATION FILED MAY 3, 1909.

938,514.

Patented Nov. 2, 1909.
8 SHEETS—SHEET 8.

WITNESSES:
G. M. Shannon.
Gordon C Bennett

INVENTOR
Charles F. Pym
BY
ATTORNEYS

UNITED STATES PATENT OFFICE.

CHARLES F. PYM, OF ESSEX, ONTARIO, CANADA, ASSIGNOR OF ONE-HALF TO KRENTLER BROTHERS COMPANY, OF DETROIT, MICHIGAN, A CORPORATION OF MICHIGAN.

LASTING-MACHINE.

938,514.

Specification of Letters Patent.

Patented Nov. 2, 1909.

Application filed May 3, 1909. Serial No. 493,684.

*To all whom it may concern:*

Be it known that I, CHARLES F. PYM, a subject of the King of England, residing at Essex, in the county of Essex and Province of Ontario, Canada, have invented certain new and useful Improvements in Lasting-Machines, of which the following is a specification, reference being had therein to the accompanying drawings.

This invention relates to lasting machines of the class shown and described in my Letters Patent No. 882,018 and dated March 17, 1908, and more particularly to improvements in the construction shown in the application filed by me on September 23, 1908 Serial No. 454,403.

The object of this invention is to provide suitable new and useful improvements in means for clamping the edge of the shoe upper in the process of lasting the heels or toes of boots and shoes, and further to provide a suitable device operating in conjunction with said clamping means to engage the edge of the shoe sole outside of the lip to hold said edge down upon the last during the wiping operation.

It is also an object of this invention to provide suitable power operated means for stretching a wire in engagement with the formed-over edge of the upper to hold the same in place after the lasting operation and to provide certain other new and useful features in the construction, arrangement and combination of parts all as hereinafter more fully described and particularly pointed out in the claims reference being had to the accompanying drawings in which.

The general construction and operation of the machine shown in the accompanying drawings are substantially the same as that shown in my above mentioned application, comprising a suitable supporting pedestal 1 provided with a head or table 2 upon which is secured brackets 3 formed with bearings for a driving shaft 4 and a counter shaft 5. Motion is transmitted from the driving shaft to the counter shaft by means of three-to-one gears 6, and a suitable belt pulley 7 is loosely mounted on the driving shaft and provided with any suitable form of clutch located in its hub casing 8. A wheel 9 secured to the driving shaft is engaged by a dog 10 to stop the shaft at the end of each revolution, said dog being released by a rod 11 actuated in any suitable manner by the operator when he desires to start the machine.

Secured upon the counter shaft is a cam wheel 12 engaged by a roller on the tail end of a rocker bar 13 which is pivoted intermediate its ends upon a shaft 14 supported in bearings upon the brackets 3. This rocker bar is formed with a guideway for a slide push bar 15 which is moved longitudinally therein by a roller on its rear end engaging a cam groove in a wheel 16. A post 17 is secured to the forward end of the push bar and pivotally attached to the lower end of said post at their point of intersection are the crossed levers 18, the forward ends of which are slotted to receive the wiper plates 19 which are pivotally connected and provided with formed inner edges to embrace the heel or toe of a shoe and wipe or stretch the shoe upper up and over the last in the process of lasting. The rearwardly extending ends of the levers 18 are connected by a plate 20 having forwardly and inwardly converging slots to receive pins carried by the ends of said levers, and to this plate is secured the forward end of a bar 21 which extends rearwardly and slides freely through bearings provided therefor upon the rocker bar. A coiled spring 22 sleeved upon the bar 21 normally holds the bar and plate moved rearwardly, and thus by reason of the inclination of the slots in said plates, yieldingly holds the wipers in closed position. Said bar is moved forwardly and the wipers positively opened by means of a cam surface upon the wheel 16 engaged by a roller upon the rear end of the said bar.

The push bar 15 with its post and pivotally attached levers carrying the wipers, and the wiper control bar 21 and carried by and rock with the rocker bar 13 as is also a push bar 23 which slides in a guideway in the rocker bar and is provided upon its rear end with a roller to engage a second cam surface upon the wheel 16.

The foregoing described parts are constructed and arranged to operate substantially as described in my above mentioned, previous application, the several cams operating to rock the rocker bar to raise and lower the wipers and to operate the push bar to open and close the wipers in timed relation to their other movements.

Pivoted intermediate its ends upon the shaft 14 is a rocker bar 24 carrying a roller upon its rear end engaging the cam wheel 25 upon the cam shaft. The forward end of this bar is provided with a hole to receive a horizontally extending eye-bolt 26 the stem of which extends through the opening in the bar and is free to turn therein being held by a nut 27. Adjustably secured within the eye of this bolt is a post 28 extending downward over the wiper plates at the longitudinal center line of said plates and provided at its extreme lower end with a member 29 secured thereon and having a downwardly extending leg 30 adapted to be brought into contact with the shoe sole 31 upon the last outside of the lip 32 thereof to hold the extreme edge of said sole down upon the last during the process of lasting so that it will not be turned or wiped up by the wipers as they stretch the upper over the heel or toe of the last and then fold it inward over the edge of the sole. Mounted upon the post 28 to slide longitudinally thereof is a member 33 having a downwardly extending curved flange or leg 34 to engage the edge of the shoe upper at the point or end of the toe or heel and clamp said edge against the wiper plates. This clamping member 33 is normally held down against the member 29 by a coiled spring 35 sleeved on the post between said clamping member and the eye-bolt 26. The post 28 being mounted in the rotatable eye-bolt is free to turn upon the lever 24 and to limit the rearward movement of said post an adjustable stop 36 is secured to the bar at its upper end and is provided at its lower end with a projection to engage the clamping member 33. By adjusting the stop 36 up or down by means of screws 37 engaging longitudinal slots therein, the point at which the clamping member 33 will be stopped relative to the wiping plates may be easily adjusted. The post 28 is yieldingly held with the member 33 in contact with the stop 36 by means of a spring 38 secured to the end of the bar 24 and extending downward to engage the clamping member 33 at its lower end.

Upon the upper side of the rocker 13 at its forward end is secured a block 39 and upon an upwardly extending pivoted pin or screw 40 secured in this block are mounted two pivot members 41 free to turn thereon and having laterally extending shanks 42 upon which are mounted arms 43 at one end to turn freely thereon. The arms 43 are held upon the shanks by means of washers 44 forced into engagement with the ends of the shanks by means of screws engaging screw-threaded openings in the ends of said shanks. The arms 43 are provided at their forward ends with sockets 45 to receive downwardly extending rods 46 secured therein. Upon the lower ends of these rods are mounted the curved clamping feet or members 47 each formed with a hub portion to receive the rod and turn freely thereon. These clamping members 47 are curved to conform substantially to the outline of the sides of the toe or heel of the shoe near the point or end of said heel or toe and are adapted to engage the inner surface of the up-standing edge of the shoe upper and clamp said edge down upon the wiper plates. By means of the pivotal adjustment of the arms 43 to the shanks 42 these clamping members 47 are free to rise or fall independently of each other and being each pivotally attached to its rod 46 it is free to turn and conform to the curve of the shoe upper when brought into contact therewith. Springs 48 are attached at one end to the screws which hold the washers 44 in place and at their opposite ends these springs engage beneath the arms 43 to normally hold said arms turned upward into contact with the transversely extending stop bar 49 pivotally attached intermediate its ends to a post 50 mounted in a socket provided therefor in the rocker bar 24. This post 50 has a longitudinal movement through its socket and is normally held in lowered position by means of a heavy spring 51 secured at one end to the rocker bar and engaging at its opposite end a collar 52 secured to the upper end of the post 50.

Figure 9:
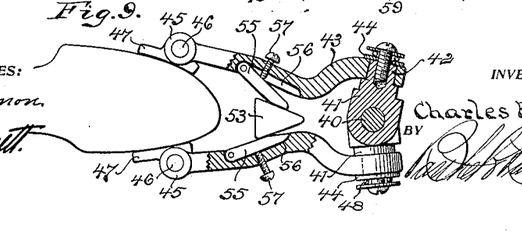
Fig. 9 is a detail of the spreader arms showing the same partly in section.

Secured to the forward end of the push bar 23 which slides within the rocker bar 13 is a wedge block 53 extending upward between the arms 43 which are so formed that when the wedge block is moved rearwardly said arms will be spread apart turning upon their pivot 40. These arms are normally held turned toward each other by means of a coiled spring 54 secured at its ends to said arms. The distance which the arms 43 will be spread apart by the wedge block is determined by means of contact members 55 pivoted at their forward ends within recesses 56 in the inner faces of the arms 43 and adapted to be turned upon their pivots to project out of the recesses, by means of adjusting screws 57 engaging screwthreaded openings in the arms 43 and contacting the inner edges of the contact members. As shown in Fig. 9 these contact members may be adjusted toward or from the wedge block 53 so that when said wedge is moved it will force the arms a greater or lesser distance apart and if it is desirable, as shown, to move one of the clamping members 47 farther from the center line of the last than the other member, this may be accomplished by projecting one of the contact members 55 farther from its socket than the other member. The clamping plates may thus be adjusted to properly engage and clamp the edge of the shoe upper of any shoe regardless of the shape of the last.

The wedge block 53 is moved rearwardly to actuate the clamping members or spreaders 47 by means of a rod 58 attached at its forward end to the push bar 23 and extended through the ear 59 secured to the side of the rocker bar 13. Sleeved upon this rod between said ear and a nut 60 on the free end of the rod is a coiled spring 61 which exerts a force to pull the wedge block toward the end of the rocker bar 13 and hold the roll on the end of the push bar 23 in contact with its cam wheel. The clamping members 47 are thus spread to engage the inner surface of the shoe upper and yieldingly clamp said upper against the wiper plates by the action of the spring 61 when said cam wheel is turned with its reduced portion in contact with the roll, permitting the rearward movement of the push bar 23. If the resistance to the movement of the spreaders 47 is greater than the force of the springs 61 said wedge block will not be moved rearwardly to the limit of its movement and the force with which the spreaders will engage and clamp the leather is thus regulated by the tension of the spring 61. The force with which the clamping member 33 will contact and clamp the edge of the shoe upper is determined by the tension of the spring 35 and said member is free to rise or fall or to be adjusted relative to the wiper plates entirely independent of the side clamping spreaders 47. The spreaders 47 have a universal adjustment, being free to turn upon an upwardly extending axis to adjust their faces to the curve of the last, being each free to rise or fall independently of the other, by the turning of its carrying arm 43 upon the shank 42, and being free to move toward or from each other by the turning of said arms upon the pivot 40.

A rocker bar 62 is pivoted intermediate its ends on the shank 14 and is provided at its rear end with a roll to engage a cam 63 on the cam shaft, a coiled spring 64 being attached to the bearing bracket and bar to hold the roll in contact with the cam. At its forward end said rocker bar is formed with guide bearings for an upwardly extending bar having a presser foot 65 at its lower end to engage the sole of the shoe on the last. A coiled spring 66 is sleeved on the bar between the bearings to yieldingly hold the foot in contact with the sole, and collars 67 above and below the lower bearing form stops to limit the movement of the bar in its bearings. Pivotally attached intermediate its ends to the presser foot near the lower end thereof, is a presser arm 68 extending rearwardly from the foot to engage the shoe sole just inside the lip of the sole at the point of the toe and thus forms a locating or positioning stop for the last when being inserted in the machine. By engaging the lip with the end of the presser arm in placing the last in the machine, said last is always properly located relative to the wiper plates. A tail piece on the presser arm extends forwardly from its pivot, and a screwthreaded bolt 69 pivotally attached at one end to the presser foot passes through an opening in the upper end of the tail piece and is provided with a thumb nut to engage said tail piece so that by turning the nut the presser arm is rocked upon its pivot to adjust its contact end relative to the contact end of the foot.

The last with the shoe to be lasted secured thereon are held in position for lasting and firmly clamped against the presser foot and presser arm by a jack consisting of a post 70 mounted in a fixed guide bearing 71 firmly secured to the forward side of the table 2. Upon the upper end of the post is a suitable seat to engage the toe portion of the last opposite the presser foot and arm or it may be made with a pin to engage a socket in the last when the shoe heel is being lasted. The post is actuated vertically in its bearing to bring its seat into contact with the last and clamp the same in position between it and the presser foot and arm, by a rocker bar 72 passing through the openings in the pedestal 1 and provided at its rear end with a roll to engage an outside cam surface on the cam wheel 12. The table 2 is provided with a tubular portion 73 extending within the upper end of the pedestal 1 and adapted to be adjusted therein to raise or lower the table and the whole operating mechanism to suit the requirements of different operators. The rocker bar 72 is pivoted intermediate its ends within the tubular member 73, passing through slots in the sides of said member and through the slots in the pedestal, so that when the table is adjusted said rocker bar will be raised and lowered with the raise of the mechanism. The forward end of the rocker bar 72 is provided with bearings for a rod 74, the upper end of which is connected to the lower end of the post 70 by means of a link 75. A collar 76 is secured upon the rod 74 below its upper bearing and sleeved upon the rod between this collar and the lower bearing for the rod is a coiled spring 77 which exerts a force to prevent the longitudinal movement of the rod in its bearings but will yield when extreme pressure is applied to the jack in clamping the last and thus prevent breakage and allow for lasts of different sizes and shape.

To automatically draw a wire around the toe of the last upon the laid over and formed down portion of the shoe upper adjacent to its edge, a supporting bracket 78 is secured to the table 2 or other convenient stationary part of the machine and extends forwardly therefrom at one side of the jack. Mounted in bearings in the forward end of this bracket is a vertically extending stub shaft 79 to which is secured a pinion 80 and a crank arm 81. A lever 82 is pivoted intermediate its ends to the outer end of the crank 81 and a link 83 is pivotally secured at one end to the bracket and at its opposite end to the long arm of the lever 82. The opposite end or short arm of the lever 82 is provided with an upwardly extending fixed hook or bill 84 to engage the securing wire 101 to be drawn about the toe of the last. The lever 85 is pivoted intermediate its ends to the table 2 and, extending across the table, is provided at its forward end, with a segmental gear 86 to engage and turn the pinion 80. The rear end of the lever 85 is provided with a roll 87 to engage a cam groove in the cam member 88 mounted upon a countershaft 89 supported in bearings upon the brackets 3. A power shaft 90 is also mounted in bearings upon said brackets and provided with a pulley 91 adapted to be engaged by a belt for driving the shaft independently of the power shaft 4 and its driving mechanism. Motion is transmitted from the power shaft 90 to the cam shaft 89 by means of two-to-one gears 92 upon said shafts. The pulley 91 is loose upon the shaft 90 and is provided with any suitable clutch mechanism located within its hub 93, and adjacent to the end of said hub is a member 94 secured upon the shaft and provided with a tooth 95 adapted to be engaged by a dog 96 pivoted upon one of the bearing brackets and arranged to engage the tooth 95 and stop the shaft at every revolution.

Figure 3:
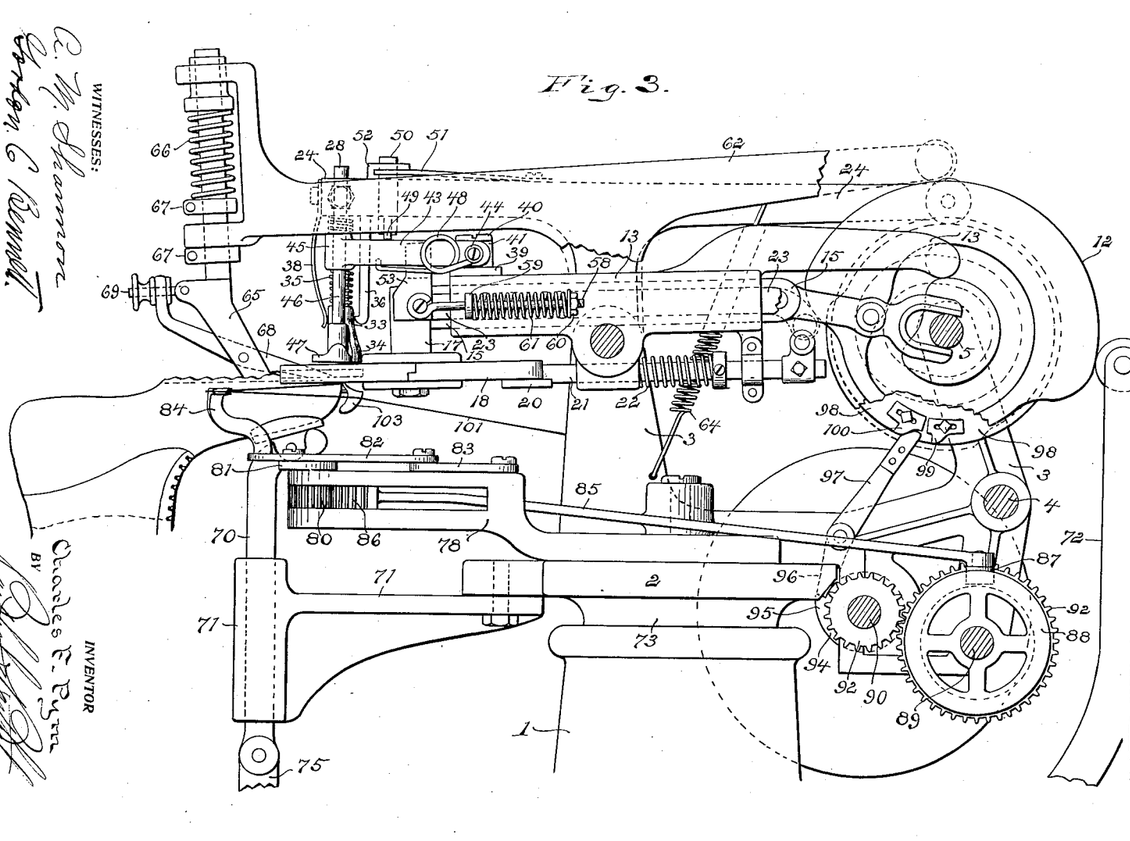
Fig. 3 is a similar view showing the parts at the end of the lasting operation or in third position.
Figure 4:
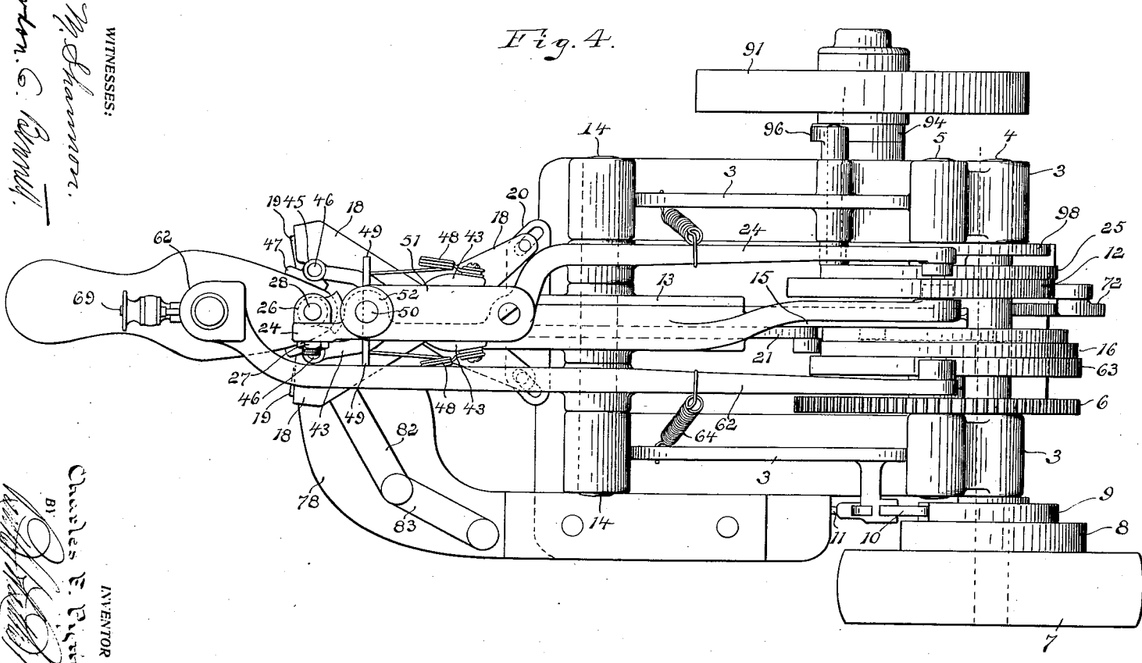
Fig. 4 is a plan view of the same.
Figure 5:
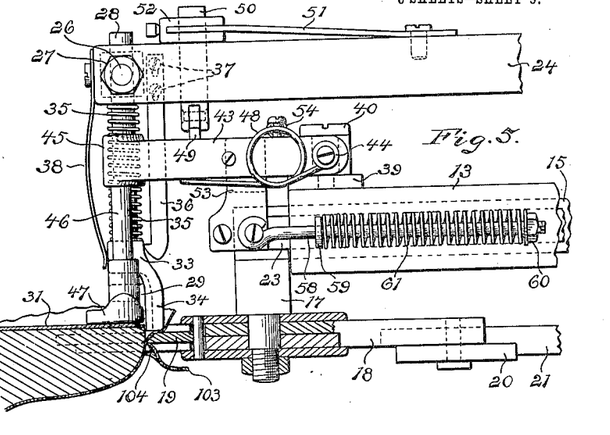
Fig. 5 is a detail of the spreader or clamping mechanism showing the same in side elevation and the wipers in section.
Figure 6:
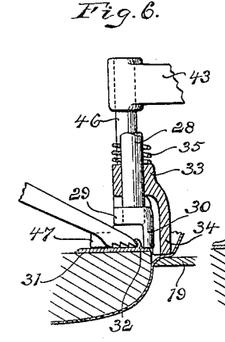
Fig. 6 is a detail of the clamping mechanism showing the same in section and the member for engaging the sole along its edge in clamping position.
Figure 7:
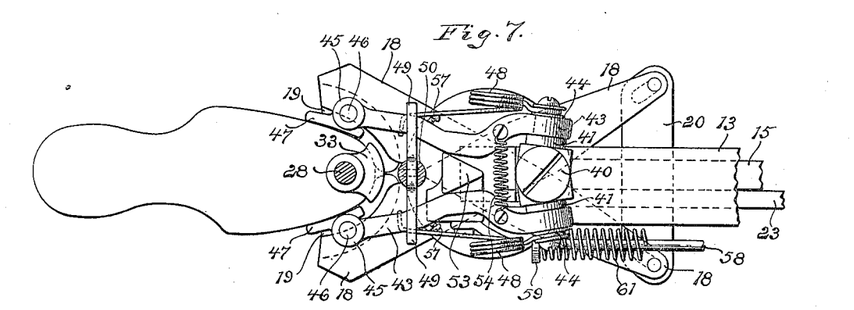
Fig. 7 is a sectional plan view of the mechanism shown in Fig. 5.
Figure 10:
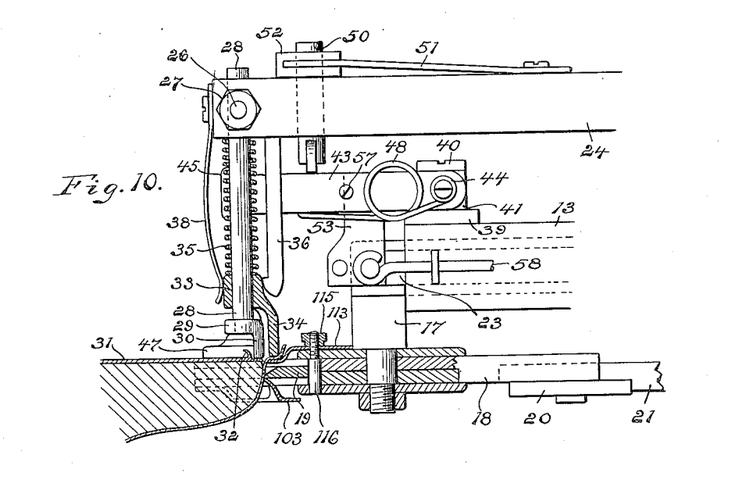
Fig. 10 is a detail similar to Fig. 5 showing a modification embodying a clamping plate.

To trip the dog 96 in timed relation to the lasting operation of the machine and allow motion to be transmitted from the pulley 91 to its shaft to turn the cam member 88 one-half of a revolution, an arm 97 is rigidly attached to the dog 96 and extends upward adjacent to a disk 98 secured upon the cam shaft 5. This disk is provided with two tripping dogs 99 and 100 adjustably secured to the disk by bolts passing through longitudinal slots in the dogs. These dogs are placed on the disk in such position that when the shaft 5 is stopped by its dog 10 in third position, as shown in Fig. 3, the end of the lever 97 will be between the two dogs having just been tripped by the dog 99 to cause one-half revolution of the cam 88 and to throw the lever 85 in one direction. When the machine is again started by the operator releasing the dog 10, the lever 97 will at once engage the dog 100 and be again tripped to turn the cam another one-half revolution and throw the lever in the other direction. The actuation of the lever 85 turns the pinion 80 and revolves the crank 81 which carries the lever 82, and thus the hook 84 is brought into engagement with the wire 101 which is indicated in Fig. 10 as attached to a tack driven in a shoe sole, said wire being led from a tension spool 102 supported upon the table 2 or other convenient stationary part of the machine, and thus said wire will be drawn by the hook around the toe of the last, the hook moving in an elliptical path as indicated at the dotted line. By means of the crank 81, lever 82, and link 83, the hook is moved in a path conforming substantially to the outline of the toe of the last.

Secured to the under side of one of the crossed levers 18 is a guide plate 103 between which plate and lever the wire is drawn, and at the end of the last this plate is formed with a projection or point 104 extending upward into contact with the under side of the wiper plate close to its edge so that the wire when drawn around the toe will be guided upward into contact with the wiper plate, and be drawn between the turned over edge of the shoe upper and the wipers. The free end of the plate 103 is bent downward so that after the operator has made the wire, which has just been drawn around the toe, fast to a tack at the other side of the last and then removed the last from the machine, the wire, leading from the spool 102 will be drawn in between the plate 103 and the lever in position to be secured to the tack on the next last placed in the machine. The securing wire is thus automatically carried around the end of the last and pulled to place to hold the edge of the upper, and the wire leading from the spool will be threaded over the guide plate by simply pulling on the wire in taking the shoe out of the machine.

Figures 15, 16, 17:
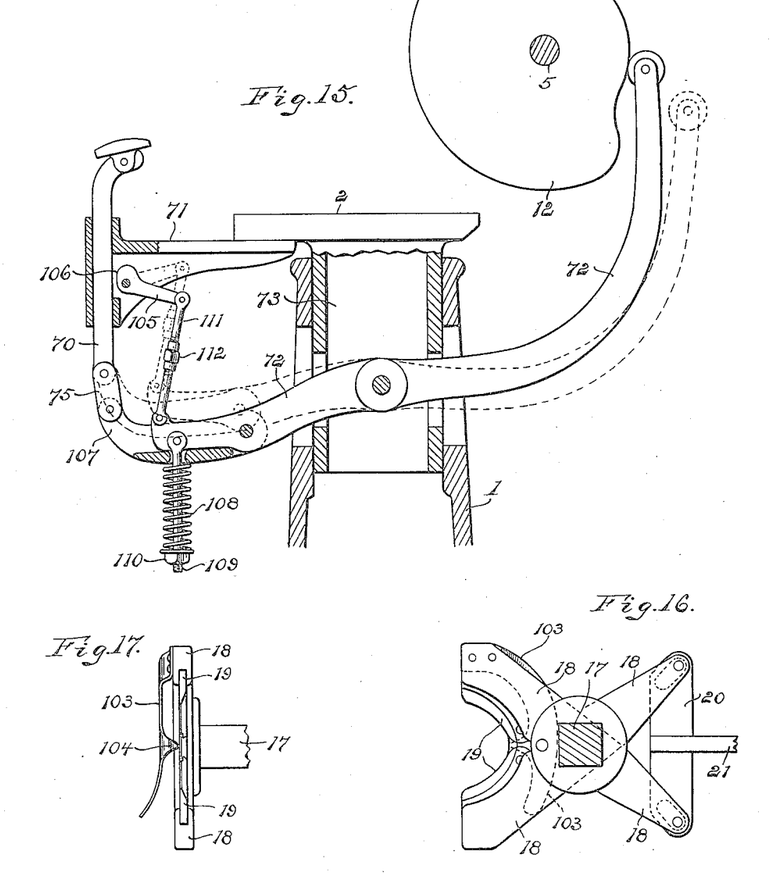
Fig. 15 is a detail showing a modification of the jack.
Fig. 16 is a detail showing the wipers and their carry-levers in plan view and the wire guide attached thereto in dotted lines.
Fig. 17 is a front end elevation of the same.

In lasting boots or shoes where considerable force is required to stretch, lay over and form down the upper, it may be found desirable to lock the jack 70 in its raised or clamping position to form a rigid support for the last which will not yield under the heavy pressure of the wipers as they pass over and form down the edges of the upper upon the last and will thus subject said edge to a positive crushing or forming action. This is accomplished as shown in Fig. 15 by mounting on the bracket 71 a lever 105 having a cam face 106 to engage the post 70 in its bearing and lock the post 1 raised to its full height. The rocker bar 72 is provided with an arm 107 pivotally attached thereto at one end and at its opposite end pivotally connected to the link 75. The end of the bar 72 is extended beyond the point at which the arm 107 is attached thereto, and said arm is normally held in position relative to the bar by a heavy coiled spring 108 sleeved upon a rod 109 pivotally attached to the forwardly projecting end of the lever 72. This spring 108 engages the lower side of the arm 107 at one end and an adjusting nut 110 on the lower end of the rod. In raising the jack if its seat comes into contact with the last and firmly clamps the same before the end of the upward movement of the rocker bar 72, said arm 107 may turn against the action of the spring 108 out of line with the bar 72, and thus lasts of different sizes and thicknesses may be used without changing the adjustment of the jack. The locking lever 105 is operated by the upward movement of the forward end of the rocker bar 72 by connecting the end of said lever with the bar by means of a link 111 and the length of said link may be adjusted by a coupling 112 so that the cam 106 will engage and lock the jack at the very end of the upward movement of the rocker bar 72.

Figures 11, 12:
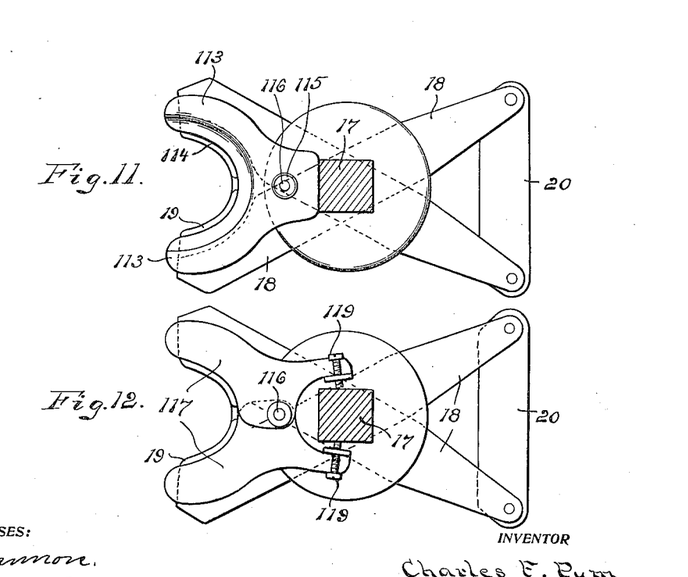
Fig. 11 is a plan view of the clamping plate in place.
Fig. 12 is a similar view showing a modified form of clamping plate.
Figure 13:
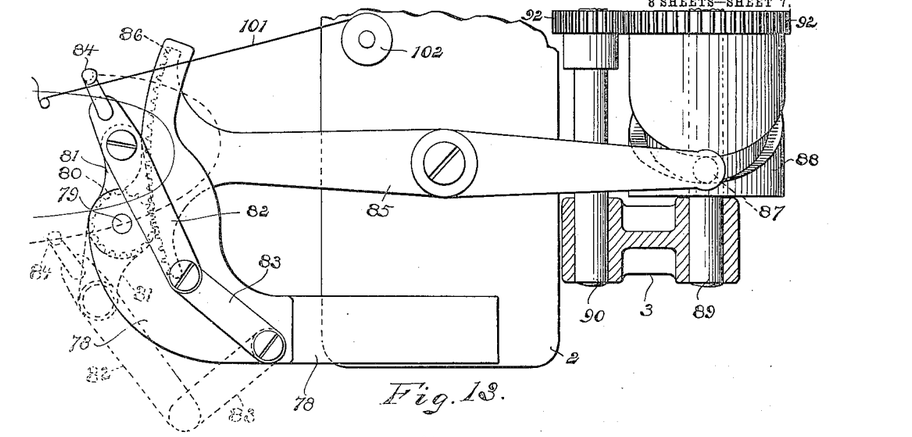
Fig. 13 is a detail of the wiring mechanism showing the same in plan view.
Figure 14:
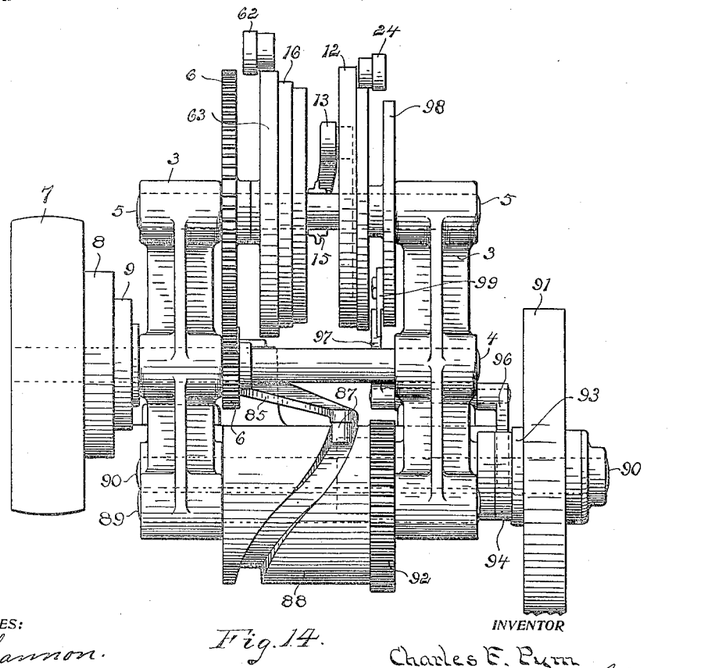
Fig. 14 is a rear elevation of the means for actuating the wiring mechanism and showing adjacent parts of the machine.

In Figs. 10 and 11 a clamping plate 113 is shown rigidly secured to the means for carrying and guiding the crossed levers 18, which plate is provided with a formed edge 114 conforming substantially to the outline of the heel or toe of the boot or shoe to be lasted. This plate is detachably held in place in any suitable manner as by a thumb nut 115 on the pin 116, with its formed edge adjacent to the upper side of the wipers so that when a boot or shoe is placed in the machine, the upstanding edge of the upper will be spread over and clamped down upon the formed edge of said plate 113 by the spreaders 47 and clamping member 33. The upper is thus clamped and held independently of the wiper plates and their movement is not resisted by the pressure of the clamping members. Further, this plate does not move with the closing in of the wiper plates over the edge of the shoe sole, and the edge of the upper is therefore held spread throughout the lasting operation and prevented from wrinkling. Separate plates may be provided for the different forms of toes or heels or it may be made in two parts 117 as shown in Fig. 12, which are adjusted toward or from each other for various widths of toes, by adjusting screws 119.

Figure 1:
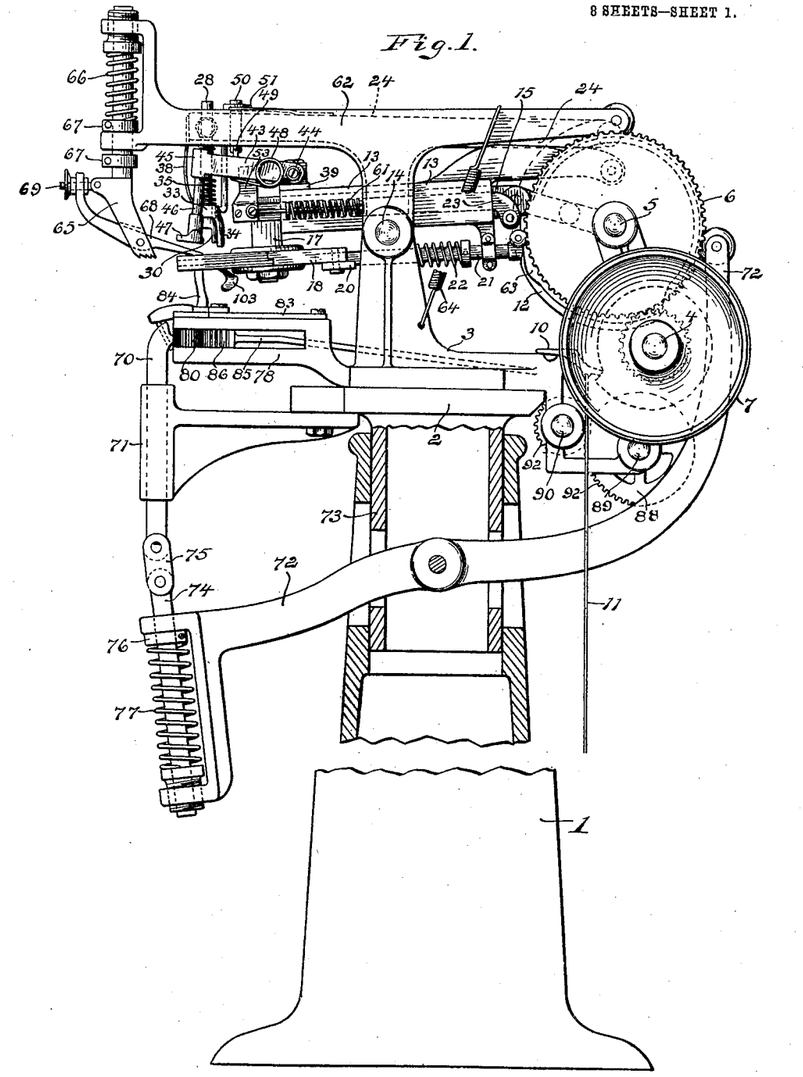
Figure 1 is a side elevation of the machine embodying the invention with parts broken away to show the construction and showing the mechanism in first or open position.
Figure 2:
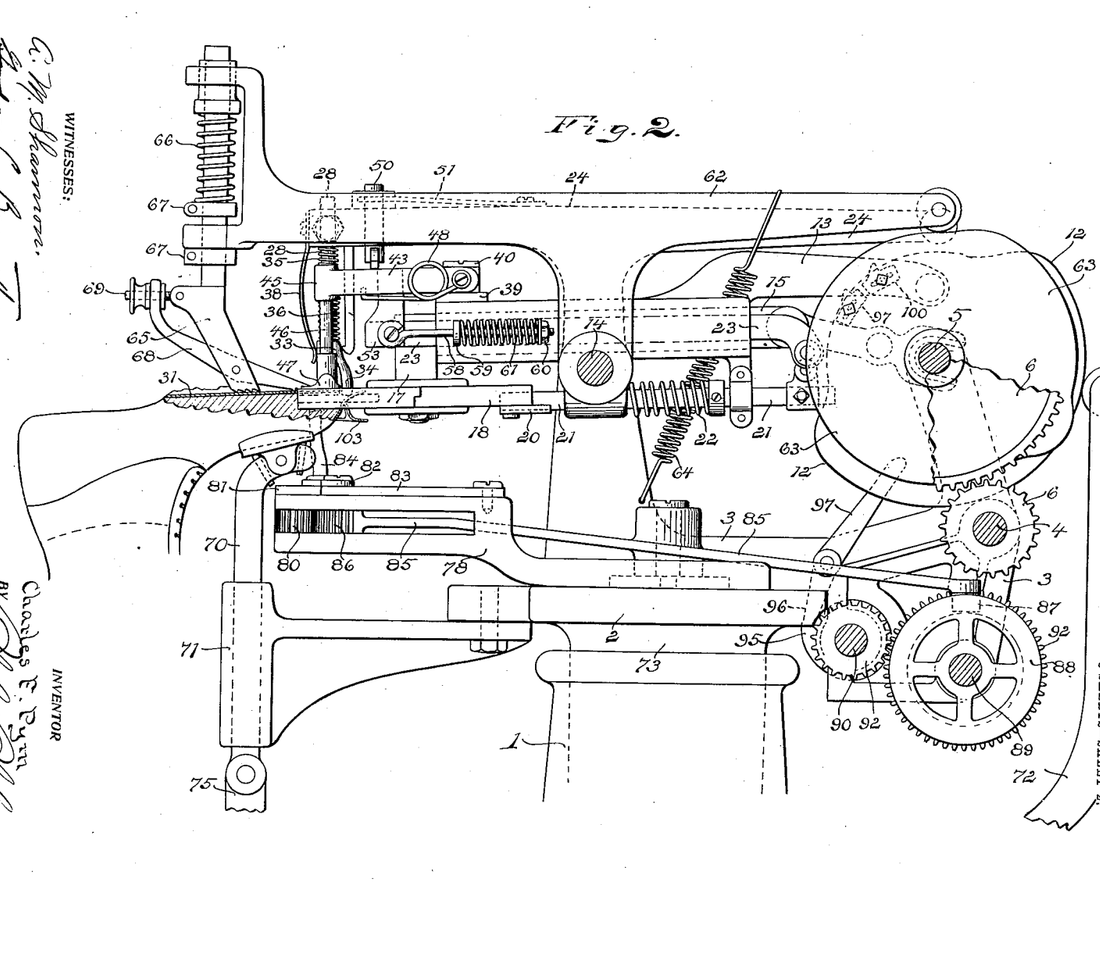
Fig. 2 is an enlarged view of the mechanism in side elevation with portions broken away to show the construction and showing the parts in second or clamping position.
Figure 8:
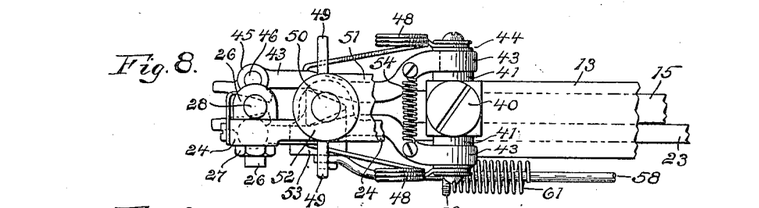
Fig. 8 is a plan view of the clamping mechanism showing the same in closed position.

The several cams upon the cam shaft 5 are so formed and positioned as to cause the several parts to operate as follows: When the machine is in first or open position, as shown in Fig. 1, the lever 72 has been rocked to lower the jack 70. The rocker bar 13 has also been tilted to lower the wipers. This downward movement of the forward end of the rocker bar 13 has carried the same away from the forward end of the rocker bar 24 which has been rocked to raise its forward end slightly and thus the arms 43 carrying the spreaders 47 have been permitted to rise at their forward ends, the springs 48 holding said levers in contact with the stop bar 49. The spreaders 47 are thus swung forward and upward away from the wiper plates and the sole member 30 and clamping member 33 carried by the post 28 secured to the rocker bar 24 are also held at a distance from the wipers. The push bar 23 is held in forward position by its cam with the wedge block 53 carried thereby also in forward position, thus permitting the coiled spring 54 to draw the arms 43 toward each other and bring the spreaders 47 inward or near together, as shown in Fig. 8. With the parts in these positions the last with the shoe secured in place thereon may be quickly and easily inserted in the machine, the last being placed with the lip 32 of the sole engaging the end of the presser arm 68 so that the last will be in proper position relative to the wipers when the machine is started and the jack raised to clamp the last. When the clamping plate 113 or 117 is used, the last will be properly located by the arm 68 so that the edge of the shoe upper will project upward adjacent to the formed edge of said plate in a position to be clamped thereto by the spreaders. When the last has been so placed in the machine and the operator releases the dog 10, the jack will be at once raised, clamping the last firmly between it and the presser foot and arm. The rocker bar 24 will then be rocked lowering the clamping member 33 into engagement with the upstanding edge of the shoe upper and the sole member 30 into engagement with the edge of the insole outside of its lip. By reason of the engagement of the stop bar 49 with the arms 43 the spreaders 47 will also be lowered and just before they engage the shoe sole, the wedge block 53 will be operated to spread the arms and move the spreaders laterally into engagement with the inner surface of the upstanding edges of the shoe upper. Further movement will cause the clamping member to firmly engage the upper and press it hard against the wipers (or clamping plate 113, when said plate is used); the insole control 30 will be moved downward out of engagement with the clamping member 33 and firmly press down upon the edge of the insole; and the spreaders will pass out over the edges of the wipers and press the edge of the upper firmly against the same, (or upon the said plate 113 when the same is used). Any unevenness or irregularity in the thickness of the leather is provided for as the spreaders are yieldingly held down by the spring 51 and each is free to rise against the action of said spring independently of the other, and the clamping member 33 is yieldingly held in contact with the work by its spring 35. When the machine is stopped in this second or clamping position by the dog 10, the end of the securing wire 101 may be made fast to the tack in the sole of the last by the operator. The machine is then again started by releasing the dog and the rocker bar 13 at once begins to raise the wipers to wipe the shoe upper up around the end of the last, and at the same time the rocker 62 may, if desired, be rocked to lower the presser foot and arm to more firmly clamp the last and press the same downward slightly by compressing the jack spring 77. If the mechanism shown in Fig. 15 for locking the jack is used, the rocking of the bar 62 at this time is dispensed with, as the locking of the jack would prevent the depressing of the last and the parts would be so adjusted that the rocker 13 would rock sufficiently to raise the wipers above the plane of the sole without lowering the last. When the wipers have been raised relative to the last so that they may pass over the sole to turn inward and form down the edge of the upper, the push bar 15 is moved forward by its cam to carry the head 17 forward and project the wipers over the sole, this movement at the same time causing said wipers to close in toward each other over the sole. Just as this forward movement of the wipers begins the rocker bar 24 is rocked slightly to lift the member 30 out of the path of the wipers, such lifting being permitted without changing the pressure of the member 33 upon the edge of the upper, by reason of the space between the upper end of the member 30 and said member 33. Just at the end of this second period of operation the arm 97 will be engaged by the dog 100 and the dog 96 tripped off to permit the actuation of the segment 86 and the carrying of the hook 84 around the end of the last to stretch the securing wire to place as before described.

While the parts are standing in third position as shown in Fig. 3 the operator may make the securing wire which has just been stretched around the end of the last, fast to a tack in the sole. He will then start the machine by again releasing the dog 10 and the parts will be returned to the position shown in Fig. 1, releasing the last and permitting the operator to remove it from the machine and put another in its place.

I claim—

1. In a machine of the character described, pivoted wipers having formed edges to engage the work, means for actuating said wipers to close the same upon the work, a member having a side conforming substantially to the outline of the heel or toe of a last supported with said side adjacent to said edges of the wipers, and means for holding the edge of a shoe upper upon the last in contact with said side.

2. In a machine of the character described, pivoted wipers having formed edges to engage the work, means for actuating said wipers to close the same upon the work, a member supported independently of the opening and closing movement of said wipers adjacent to the formed edges thereof, and means for clamping the edge of a shoe upper to said member.

3. In a machine of the character described, pivoted wipers, means for actuating said wipers to close the same upon the work, a member supported independently of said wipers and their opening and closing movement adjacent to the upper side of said wipers and having a side conforming substantially to the outline of the heel or toe of a last, and means for clamping the edge of a shoe upper upon the last, to said member.

4. In a machine of the character described, wiper plates, means for carrying and actuating said plates, a clamping plate having an edge conforming substantially to the outline of a heel or toe of a last and carried by said supporting means for the wipers with its formed edge in a position to be engaged by the upstanding edge of a shoe upper upon the last, and means for clamping the said edge of the shoe upper to the formed edge of the clamping plate.

5. In a machine of the character described, the combination of wiper plates, crossed levers to carry and actuate said wiper plates, means for supporting the crossed levers, a clamping plate rigidly attached to said carrying means and supported thereby with one edge adjacent to the end of a last having a shoe upper thereon to be engaged by the wiper plates, movable clamping means for clamping the upstanding edge of the shoe upper to the clamping plate, and means for operating said clamping means in timed relation to the movement of the crossed levers.

6. A machine of the character described comprising wipers, means for actuating said wipers, a plurality of members adapted to engage a shoe upper near its edge and clamp the same along the formed edges of the wipers and each adapted to rise or fall independently of the others, and means for automatically moving said members into engagement with the inner surface of said upper in timed relation to the movement of said wipers to clamp and hold said edge during the lasting operation.

7. A machine of the character described comprising wipers, means for actuating said wipers, members mounted to freely turn upon an upwardly extending axis to adjust themselves to the inner surface of a shoe upper near its edge to spread and clamp the same, pivoted means for carrying said members adapted to turn to bring said members into contact with the upper and spread the same, and means for actuating the carrying means.

8. A machine of the character described comprising wipers, means for actuating said wipers, members adapted to engage the inner surface of a shoe upper near its edge and spread and hold the same, pivoted arms to which said members are attached each arm being adapted to turn both laterally and upwardly to permit the spreading of said members apart and to allow said members to rise independently of each other, and means for spreading the arms apart and permitting the same to independently rise or fall during the spreading movement.

9. A machine of the character described comprising wipers, means for actuating said wipers, clamping members each pivoted to turn upon an upwardly extending axis and adapted to engage the inner surface of a shoe upper near its edge and spread and hold the same, a carrying arm for each clamping member said arms being pivoted at one end to turn both laterally and upwardly to permit the spreading of said clamping members apart and to allow said members to rise, and means operating in timed relation to the movement of the wipers to turn said arms laterally, and spread the clamping members apart.

10. A machine of the character described comprising wipers, means for actuating said wipers, clamping members adapted to engage the inner surface of a shoe upper near its edge and spread and hold the same carrying means for said members, means for moving the arms laterally to bring the members into contact with the inner surface of the upper and clamp the same, an independently movable clamping member to engage said edge of the shoe upper at the point or end of the heel or toe of the last, and means for raising or lowering said clamping member independently of the other clamping members and in timed relation to the movement of the wipers.

11. A machine of the character described comprising wipers, means for actuating said wipers, a sole member to engage the sole upon a last outside of the lip of the sole to hold the edge of the sole down upon the last during the lasting operation, an upwardly extending carrying member for said sole member, a clamping member carried by and slidable upon the carrying member to engage and hold the upstanding edge of a shoe upper upon the last adjacent to the sole member, and means for raising and lowering the carrying member.

12. A machine of the character described comprising wipers, means for actuating said wipers, a sole member having a downwardly extending leg to engage a sole upon a last along its edge outside of its lip, a clamping member having a leg extending downward adjacent to the leg of the sole member to engage and clamp the edge of the shoe upper upon the last, and a member adapted to engage the shoe sole inside of its lip opposite the leg of the sole member, and means for raising and lowering the sole member and the clamping member.

13. A machine of the character described comprising wipers, means for actuating said wipers, an upwardly extending post, a sole member secured to the lower end of the post and having a leg adapted to engage the edge of a sole upon a last, a clamping member mounted upon said post above the sole member and having a leg extending downward adjacent to the leg of the sole member to engage and clamp the edge of a shoe upper upon the last, and means for actuating the post to raise and lower said members.

14. A machine of the character described comprising wipers, means for actuating said wipers, an upwardly extending post, a sole member secured to said post at its lower end and adapted to engage the edge of a sole upon a last outside of the lip thereof, a clamping member slidably mounted upon the post above the sole member and adapted to engage and hold the edge of a shoe upper upon the last, means for yieldingly preventing the sliding of the clamping member upon the post, and means for moving the post to bring the sole member and clamping member into clamping position.

15. A machine of the character described comprising wipers, means for actuating said wipers, side clamping members adapted to engage the edge of a shoe upper upon a last, an end clamping member adapted to engage said upper at the end of the last, and means for raising and lowering the end clamping member adapted to move the side clamping members into clamping position when the end clamping member is lowered.

16. A machine of the character described comprising wipers, means for actuating said wipers, a clamping member adapted to engage and clamp a shoe upper upon a last at the end of the last, side clamping members adjacent to the said member adapted to engage and clamp said upper, means for raising and lowering the end clamping member, and means carried by said actuating means to yieldingly move the side clamping members into clamping position when the end clamping member is lowered.

17. A machine of the character described comprising wipers, means for actuating said wipers, a clamping member adapted to engage and clamp the edge of a shoe upper upon a last at the end of said last, clamping members to engage and clamp the edge of said upper at each side of the end members, arms to one end of which the side clamping members are attached and pivotally supported at their opposite ends to permit the rise and fall of said members, means for carrying and actuating the end clamping member adapted to engage said arms intermediate their ends and lower the side clamping members when the end member is lowered.

18. A machine of the character described comprising wipers, means for actuating said wipers, an end clamping member adapted to engage and clamp the edge of a shoe upper upon a last, a rocker bar to carry and raise and lower said member, arms pivoted at one end to permit the same to rise, and fall at their opposite ends, clamping members attached to and carried by the free ends of said arms, and springs to turn said arms upward into engagement with the rocker bar.

19. A machine of the character described comprising wipers, means for actuating said wipers, a member to engage and clamp the edge of a shoe upper upon a last at the end of the last, a rocker bar for carrying and actuating said member, arms pivoted at one end to rise and fall and to move laterally, clamping members carried by the free ends of said arms to engage and clamp the edge of the upper at each side of the end clamping member, a transverse bar pivoted intermediate its ends to the rocker bar and engaging the upper side of said arms, and springs to hold the arms in contact with said bar.

20. In a machine of the character described, the combination with reciprocable wiper plates adapted to be projected over the edge of an upper upon a last in the process of lasting and means for actuating the same, of a member adapted to engage adjacent to its lip at the toe portion, a shoe sole upon said last to locate the last relative to the wiper plates, movable means for holding the last with said sole in engagement with said member, a movable sole member adapted to engage the sole along its edge outside of the lip, and means for moving the sole member in timed relation to the movement of the wiper plates.

21. In a machine of the character described, the combination with means for laying over the edge of an upper upon a last in the process of lasting, of a jack comprising a movable post, a guide bearing for said post, a rocker bar, means connecting said rocker bar and post and permitting a variation in the degree of movement of the post relative to the bar, and means adapted to be operated by said rocker bar to lock said post against movement when said bar is in a certain position.

22. In a machine of the character described, the combination with means for laying over the edge of an upper upon a last in the process of lasting, of a jack comprising a movable post, a rocker having a fixed movement, a member pivotally attached to the rocker and connected at its opposite end to the post, a spring for normally holding said member from turning relative to said rocker, and means operated by the rocker for locking the post at the end of the movement of the rocker.

23. In a machine of the character described, the combination with means for laying over the edge of an upper upon a last in the process of lasting, of a jack comprising a movable post, a fixed guide bearing for said post, a rocker bar to actuate the post having a fixed movement, a member pivotally attached to the rocker bar and to said post, a spring to normally hold said member in a certain position relative to said rocker, a pivoted locking member adapted to be turned into engagement with the post to lock the same in its bearing, and means connecting said locking member and the rocker bar to actuate the former by the movement of the latter.

24. In a machine of the character described, the combination with means for laying over the edge of an upper upon a last in the process of lasting, of means adapted to engage a shoe sole upon a last, a fixed guide bearing, a longitudinally movable post in said bearing, a last seat upon the upper end of said post, and means for actuating the post in timed relation to the movement of the laying over means to clamp the last.

25. In a machine of the character described, the combination with means for laying over the edge of an upper upon a last in the process of lasting, of a member normally positioned at one side of a last and adapted to carry a wire around the toe or heel of a boot or shoe upon the last, and means for moving said member in an elliptical path around the end of the last to the other side thereof.

26. In a machine of the character described, the combination with means for laying over the edge of an upper upon a last in the process of lasting, of an oscillating arm, means for actuating said arm, means carried by one end of said arm for engaging a wire, and means attached to the opposite end of said arm for causing said wire engaging means to follow substantially the outline of the end of a last when said oscillating arm is turned.

27. In a machine of the character described, the combination with means for laying over the edges of an upper upon a last in the process of lasting, of an oscillatory member, means for oscillating said member, a lever pivoted intermediate its ends to said oscillatory member and provided with means at one end for engaging a securing wire to carry the same about the end of the last, and a link pivoted to the opposite end of said lever.

28. In a machine of the character described, the combination with means for laying over the edge of an upper upon a last in the process of lasting, of an oscillatory arm, a pinion to actuate said arm, a segment engaging said pinion, a lever pivoted intermediate its ends upon the end of said arm and provided with means at one end for engaging a wire, and a link pivoted at one end to the opposite end of said lever and at its other end to a fixed support.

29. In a machine of the character described, the combination with wiper plates and levers for carrying and actuating said plates, of means for supplying a wire located at one side of said plates which wire is adapted to be attached to the last at that side, means for engaging said wire between its point of attachment to the last and the supplying means to carry the wire around the end of the last, and a guide to guide the wire into engagement with the laid over edge of the upper, said guide being secured at one end to one of the levers at the side of the plates at which the wire supply is located and extended around adjacent to the end of said last.

30. In a machine of the character described, the combination with means for laying over the edge of an upper upon a last in the process of lasting, and means for actuating said laying over means comprising a rotary member, of an oscillatory member adapted to stretch a wire around the end of a last, means for actuating said oscillatory member, means for imparting motion to said actuating means comprising a clutch, and means carried by the rotatable member of the laying over actuating means, for releasing said clutch.

In testimony whereof I affix my signature in presence of two witnesses.

CHARLES F. PYM.

Witnesses:
OTTO F. BARTHEL,
ANNA M. SHANNON.